United States Patent
Kameda

(10) Patent No.: US 8,720,507 B2
(45) Date of Patent: May 13, 2014

(54) PNEUMATIC TIRE WITH HIGH SPEED DURABILITY

(75) Inventor: Yoshihiro Kameda, Hiratsuka (JP)

(73) Assignee: The Yokohoma Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/447,499

(22) PCT Filed: Nov. 1, 2007

(86) PCT No.: PCT/JP2007/071667
§ 371 (c)(1),
(2), (4) Date: May 22, 2009

(87) PCT Pub. No.: WO2008/054023
PCT Pub. Date: May 8, 2008

(65) Prior Publication Data
US 2010/0012245 A1    Jan. 21, 2010

(30) Foreign Application Priority Data
Nov. 1, 2006 (JP) .................. 2006-297610

(51) Int. Cl.
*B60C 1/00* (2006.01)
*B60C 11/00* (2006.01)

(52) U.S. Cl.
USPC ...................................... 152/209.5

(58) Field of Classification Search
USPC ............................ 152/209.5, 905
See application file for complete search history.

(56) References Cited

U.S. PATENT DOCUMENTS

| | | | |
|---|---|---|---|
| 4,381,810 A | 5/1983 | Cady et al. | |
| 4,396,052 A * | 8/1983 | Ahagon et al. | 152/209.5 |
| 5,702,546 A * | 12/1997 | Itoh et al. | 152/209.4 |
| 6,305,450 B1 * | 10/2001 | Guermandi | 152/209.5 |
| 6,516,847 B1 * | 2/2003 | Amaddeo et al. | 152/209.5 |
| 6,626,216 B2 * | 9/2003 | Minagoshi | 152/209.5 |
| 2002/0148545 A1 * | 10/2002 | Nanni et al. | 152/450 |
| 2004/0016495 A1 | 1/2004 | Serra et al. | |
| 2006/0272757 A1 * | 12/2006 | Mizuno | 152/209.5 |
| 2007/0006953 A1 * | 1/2007 | Galimberti et al. | 152/209.5 |

FOREIGN PATENT DOCUMENTS

| | | | |
|---|---|---|---|
| CN | 1298811 A | | 6/2001 |
| CN | 1367742 A | | 9/2002 |
| EP | 825227 | * | 2/1998 |
| EP | 1241213 A2 | | 9/2002 |
| EP | 1557294 | * | 7/2005 |

(Continued)

OTHER PUBLICATIONS

Mark et al, Science and Technology of Rubber, pp. 432-437, date: 1994.*

(Continued)

*Primary Examiner* — Steven D Maki
(74) *Attorney, Agent, or Firm* — Novak Druce Connolly Bove + Quigg LLP

(57) ABSTRACT

A pneumatic tire with superior durability having a tread part comprising a cap tread layer (layer A) and an under tread layer (layer B), wherein, in the pneumatic tire, when storage elastic moduli of the rubber compositions constituting the layer A and the layer B are designated as $E_A$ and $E_B$, the storage elastic moduli $E_A$ (60° C.) and $E_B$ (60° C.) determined at a temperature of 60° C. satisfy the following formulae (1) and (2):

$$E_A(60° C.)/E_B(60° C.) \leq 0.66 \quad (1)$$

$$10(\text{MPa}) \leq E_B(60° C.) \quad (2)$$

3 Claims, 1 Drawing Sheet

(56) References Cited

FOREIGN PATENT DOCUMENTS

| | | | |
|---|---|---|---|
| JP | 58128904 | | 8/1983 |
| JP | 60061312 A | | 4/1985 |
| JP | 08104107 | | 4/1996 |
| JP | 11-245619 A | | 9/1999 |
| JP | 2000185520 | | 7/2000 |
| JP | 2001-088513 | * | 4/2001 |
| JP | 2001088513 | | 4/2001 |
| JP | 2003291610 | | 10/2003 |
| WO | WO-01/03954 A1 | | 1/2001 |
| WO | 2005/002883 | * | 1/2005 |

OTHER PUBLICATIONS

German Office Action dated Nov. 16, 2009 in counterpart of German Application No. 11 2007 002 602.2.

Mark et al., Science and Technology of Rubber, Second Edition, San diego, Academic Press, Inc. 1994, p. 432-437.

German Office Action dated Apr. 27, 2012 in counterpart of German Application No. 112007002602.2.

* cited by examiner

PNEUMATIC TIRE WITH HIGH SPEED DURABILITY

CROSS REFERENCE TO RELATED APPLICATIONS

This application is a National Stage of PCT/JP2007/071667 filed Nov. 1, 2007 which in turn claims priority from Japanese Application 2006-297610 filed Nov. 1, 2006, the entire contents of which are incorporated herein by reference.

TECHNICAL FIELD

The present invention relates to a pneumatic tire with superior high speed durability, more particularly relates to a pneumatic tire with superior high speed durability and further with superior steering stability.

BACKGROUND ART

In recent years, motor vehicles have been made higher performance such as with vehicles capable of driving at a speed of 350 km/h or more. In the past, there have been proposed technologies to increase the high speed durability performance by controlling the heat generation of compounds, that is, minimizing the tan δ of rubber (see, for example, Japanese Patent Publication (A) No. 12-185520). However, there were problems that the braking performance was decreased. Further, Japanese Patent Publication (A) No. 8-104107 proposes a pneumatic tire having an improved steering stability and riding comfort by making the relationship between the shear modulus of elasticity at 60° C. of the cap tread layer (i.e., layer A) and the under tread layer (i.e., layer B) of the tire tread (respectively $G_A$ and $G_B$) to:

$G_A < G_B$
$G_A = 1.5$ to 2.0 MPa and
$G_B = 1.6$ to 3.0 MPa.

However, further improvements are being demanded.

DISCLOSURE OF THE INVENTION

Accordingly, an object of the present invention is to provide a pneumatic tire with superior both durability and steering stability.

In accordance with the present invention, there is provided a pneumatic tire with superior durability having a tread part comprising a captread layer (layer A) and an undertread layer (layer B), wherein, in the pneumatic tire, when storage elastic moduli of the rubber compositions constituting the layer A and the layer B are designated as $E_A$ and $E_B$, the storage elastic moduli $E_A$ (60° C.) and $E_B$ (60° C.) determined at a temperature of 60° C. satisfy the following formulae (1) and (2):

$$E_A(60° \text{ C.})/E_B(60° \text{ C.}) \leq 0.66 \tag{1}$$

$$10(\text{MPa}) \leq E_B(60° \text{ C.}) \tag{2}$$

According to the present invention, the durability of a conventional pneumatic tire can be greatly improved by making the composition of the under tread layer of the tread part of the pneumatic tire using a rubber composition having a high storage elastic modulus. Further according to the present invention, a pneumatic tire superior in both the durability and steering stability can be obtained by making the ratio of the cross-sectional areas of the cap tread layer (layer A) and the under tread layer (layer B) a certain specific value.

BEST MODE FOR CARRYING OUT THE INVENTION

Figure 1:
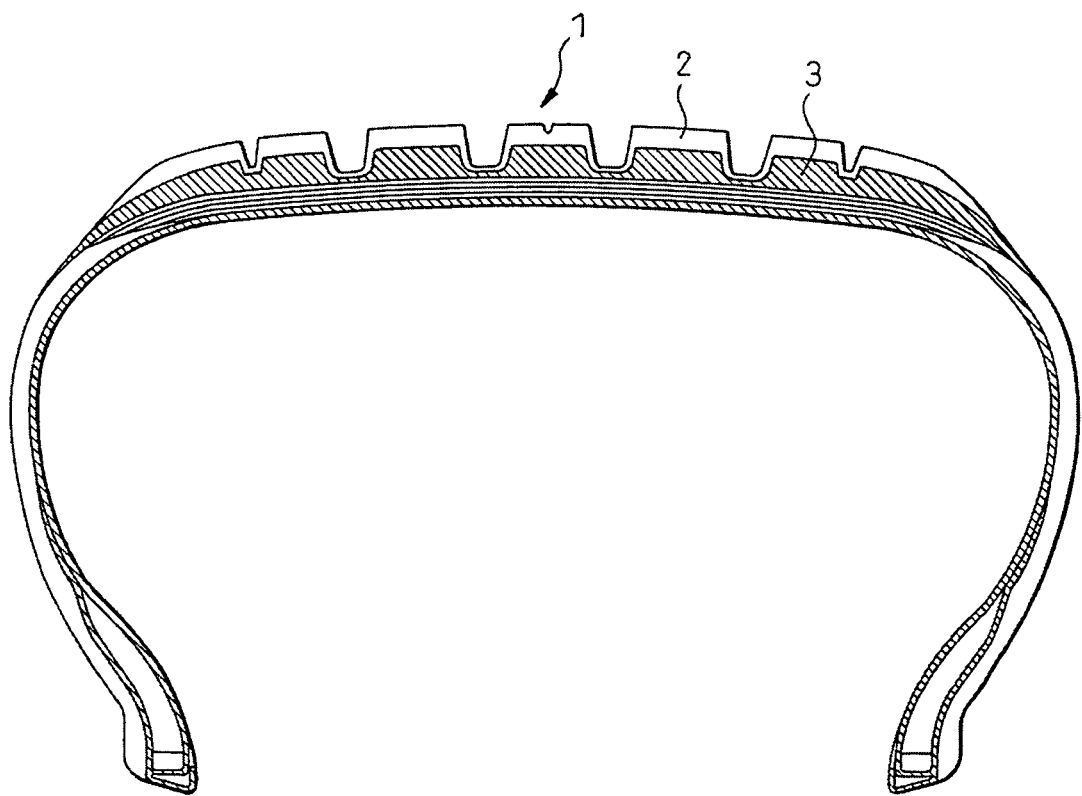
FIG. 1 is a cross-sectional view schematically showing the arrangement of a cap tread layer (layer A) and an under tread layer (layer B) of a tread part of a pneumatic tire according to the present invention.

The singular terms (e.g., "a", "an" and "the") used in the description and the attached claims shall include the plural term, except that the singular is clear from the context.

The present inventors engaged in research to solve the above problem and, as a result, found that, by making the under tread layer (layer B) of the tread part a certain specific high storage elastic modulus and by decreasing the temperature dependency, the durability can be greatly improved from the past. Further, the present inventors found that, by making the ratio of the cross-sectional areas of the cap tread layer and the under tread layer a certain specific value, a pneumatic tire superior in both the durability and steering stability can be provided.

Specifically, as shown in FIG. 1, there can be provided a pneumatic tire with superior durability having a tread part 1 comprising a cap tread layer (layer A) 2 and an under tread layer (layer B) 3, wherein, in the pneumatic tire, when storage elastic moduli of the compounds (i.e., rubber compositions) are designated as $E_A$ and $E_B$, the relationship of the storage elastic moduli determined at a temperature of 60° C. ($E_A$ (60° C.) and $E_B$ (60° C.)) satisfies the following formulae (1) and (2):

$$E_A(60° \text{ C.})/E_B(60° \text{ C.}) \leq 0.66 \tag{1}$$

$$10(\text{MPa}) \leq E_B(60° \text{ C.}) \tag{2}$$

Here, $E_A$ (60° C.) and $E_B$ (60° C.) are determined, based upon the following measurement method of the storage elastic modulus E.

In the present invention, when $E_A$ (60° C.)/$E_B$ (60° C.) does not satisfy the above formula (1), that is, when $E_A$ (60° C.)/$E_B$ (60° C.)>0.66, a remarkable improvement in the durability cannot be expected. Further, when $E_B$ (60° C.)<10 (MPa), the effect of the present invention becomes small.

Preferably, the difference between the storage elastic modulus $E_B$ (20° C.) of the rubber of layer B determined at 20° C. and the storage elastic modulus $E_B$ (60° C.) determined at 60° C. satisfies the following formula (3):

$$E_B(20° \text{ C.}) - E_B(60° \text{ C.}) \leq 4.5(\text{MPa}) \tag{3}$$

When the storage elastic modulus of the rubber composition of the layer B does not satisfy the above formula (3), that is, when $E_B$ (20° C.)−$E_B$ (60° C.)>4.5, the decrease in the physical properties of the layer B, when the rubber generates heat becomes greater and the desired effect is liable to not be obtained.

Further, when the cross-sectional area of the layer A is $A_A$ and the cross-sectional area of the layer B is $A_B$ in FIG. 1, $A_A/(A_A+A_B)$ preferably satisfies the following relationship (4):

$$0.30 \leq A_A/(A_A+A_B) \leq 0.60 \tag{4}$$

When the above formula (4) is not satisfied, that is, when $A_A/(A_A+A_B)<0.30$, the steering stability at the end stage of tire abrasion is liable to be decrease. Further, when $A_A/(A_A+A_B)>0.60$, the effect of the present invention (i.e., high speed durability) is liable to be decrease. Formula (4) more preferably is as follows:

$$0.45 \leq A_A/(A_A+A_B) \leq 0.50 \quad (5)$$

The rubber composition comprising the layer B according to the present invention includes preferably at least 60 parts by weight of, more preferably 65 to 100 parts by weight, of carbon black, based upon 100 parts by weight of rubber from the viewpoint of rubber reinforcement performance. The type of carbon black is not limited in particular, however, it is preferable to use carbon black having a nitrogen adsorption specific surface area ($N_2SA$) of 40 to 150 $m^2/g$ (measured according to JIS K6217) and a dibutyl phthalate absorption (DBP) of 50 to 200 $cm^3/100$ g (measured according to JIS K6217). More preferably, carbon black having an $N_2SA$ of 60 to 140 $m^2/g$ and a DBP of 70 to 180 $cm^3/100$ g is used. Many such carbon blacks are commercially available.

The rubber components constituting the cap tread layer (layer A) and under tread layer (layer B) according to the present invention may be suitably selected from, for example, natural rubber (NR), polyisoprene rubber (IR), polybutadiene rubber (BR), styrene-butadiene copolymer rubber (SBR), SBR, BR and liquid IR end modified with carbonyl groups, isocyanate groups, alkoxyl groups, etc., polybutadiene rubber including syndiotactic crystal ingredients (for e.g., UBEPOL VCR412), etc. within a scope of satisfying the above relational formulae (1) and (2) and more preferably the relational formulae (3) and (4). These may be used alone or in any blends thereof. Adjustment so that the storage elastic modulus is within the above ranges would be easy for a person skilled in the art by adjusting the type of the rubber (or rubber blend) used and the blended components (e.g., the type and amount of carbon black, the amount of sulfur and the amount of plasticizer (aromatic oil etc.)). Specifically speaking, this can be obtained by blending 50 parts by weight of NR, 50 parts by weight of UBEPOL VCR412, 70 parts by weight of N234 grade carbon black, 5 parts by weight of aromatic oil and a vulcanization system.

The rubber compositions used in the present invention may contain various additives, in addition to the above components, such as silica and other fillers, vulcanization or cross-linking agents, vulcanization or cross-linking accelerators, various types of oils, antioxidants, plasticizers and other various types of additives generally compounded in tire use and other rubber composition. These additives may be mixed by a general method to obtain compositions for vulcanization or cross-linking. The compounding amounts of these additives may be made the conventional general amounts so long as the object of the present invention is not adversely affected. Further, the production of the pneumatic tire may follow conventional methods.

Examples of suitable vulcanization or cross-linking accelerator are N-tert-butylbenzothiazole-2-sulfenamide (accelerator 1), N-cyclohexyl-benzothiazole-2-sulfenamide (accelerator 2), and diphenyl guanidine (accelerator 3).

EXAMPLES

Examples will now be used to further explain the present invention, however, the scope of the present invention is by no means limited to these Examples.

Preparation of Compounds I to IX

In each of the formulations shown in Table I, the ingredients other than the vulcanization accelerator and sulfur were mixed in a 1.8 liter internal mixer for 5 minutes and discharged when reaching 160° C. to obtain a master batch. This master batch was mixed with the vulcanization accelerator and sulfur by an open roll to obtain each of the compounds I to IX.

Then, each of the compounds thus obtained was press vulcanized in a 15×15×0.2 cm mold at 160° C. for 20 minutes to prepare a rubber sheet which was then determined for the physical properties of the vulcanized rubber using the test methods shown below. The results are shown in Table I.

Test Methods for Evaluation of Rubber Physical Properties

Storage elastic modulus E: Determined at 20° C. and 60° C. using Toyo Seiki Seisakusho viscoelastic spectrometer under conditions of static strain of 10%, dynamic strain of ±2% and frequency of 20 Hz.

TABLE I

| | Compound No. | | | | | | | | |
|---|---|---|---|---|---|---|---|---|---|
| | I | II | III | IV | V | VI | VII | VIII | IX |
| Formulation (phr) | | | | | | | | | |
| Natural rubber | 50 | 50 | 75 | 50 | — | 20 | 20 | 20 | 20 |
| SBR 1 | — | — | — | — | 137.5 | 110 | 110 | — | — |
| SBR 2 | — | — | — | — | — | — | — | 96.25 | 96.25 |
| BR 1 | 50 | — | — | — | — | — | — | 10 | 10 |
| BR 2 | — | 50 | 25 | 50 | — | — | — | — | — |
| Carbon | 78 | 70 | 75 | 25 | 70 | 70 | 90 | 20 | 25 |
| Silica | — | — | — | 45 | — | — | — | 70 | 100 |
| Silane coupling agent | — | — | — | 3.6 | — | — | — | 5.6 | 8 |
| Stearic acid | 1.5 | 1.5 | 1.5 | 1.5 | 2 | 2.5 | 2.5 | 2.5 | 2.5 |
| Zinc white | 2.5 | 2.5 | 2.5 | 2.5 | 3 | 3 | 3 | 3 | 3 |
| Oil | 3 | 5 | 5 | 5 | 2 | 10 | 10 | 9 | 22 |
| Antioxidant | 1.5 | 1.5 | 1.5 | 1.5 | 2.2 | 1 | 1 | 2.5 | 2.5 |
| Wax | 0.1 | 0.1 | 0.1 | 0.1 | 0.3 | 0.3 | 0.3 | 2 | 2 |
| Accelerator 1 | 2.2 | 2.2 | 2.1 | 2.1 | — | — | — | — | — |
| Accelerator 2 | — | — | — | — | 2.2 | 1.8 | 1.8 | 2 | 2 |
| Accelerator 3 | — | — | — | — | — | — | — | 2 | 2 |
| Sulfur | 1.9 | 1.9 | 1.8 | 1.8 | 1.9 | 2.2 | 2.2 | 2 | 1.8 |
| Vulcanization retarder | 0.2 | 0.2 | 0.2 | 0.2 | — | — | — | — | — |

TABLE I-continued

|  | Compound No. | | | | | | | | |
|---|---|---|---|---|---|---|---|---|---|
|  | I | II | III | IV | V | VI | VII | VIII | IX |
| Rubber physical properties | | | | | | | | | |
| Elasticity modulus E (20° C.) (MPa) | 15.2 | 18.5 | 14.2 | 14.3 | 12.9 | 14.2 | 16.1 | 10.57 | 11.77 |
| Elasticity modulus E (60° C.) (MPa) | 12.9 | 15.1 | 11.6 | 12.5 | 5.7 | 6.1 | 8.3 | 6.98 | 7.64 |

Footnotes of Table I
Natural rubber: Natural rubber grade STR20
SBR 1: Nipol 1712 (37.5 phr oil extended) made by Zeon Corporation
SBR 2: Nipol 1721 (37.5 phr oil extended) made by Zeon Corporation
BR 1: BR1220 made by Zeon Corporation
BR 2: UBEPOL VCR412 made by Ube Industries
Carbon: Carbon black Seast N ($N_2SA$: 120 $m^2/g$, DBP:85 $cm^3/100$ g) made by Tokai Carbon
Silica: Zeosil 1165 MP made by Rhodia
Silane coupling agent: KBE-845 made by Shin-etsu Chemical
Stearic acid: Beads Stearic Acid made by NOF Corporation
Zinc white: Zinc Oxide Type 3 made by Seido Chemical Industry
Oil: Process X-140 made by Japan Energy Corporation
Antioxidant: 6PPD made by Flexsys
Wax: Sunnoc made by Ouchi Shinko Chemical Industrial
Vulcanization accelerator 1: Nocceler NS-P made by Ouchi Shinko Chemical Industrial
vulcanization accelerator 2: Nocceler CZ-G made by Ouchi Shinko Chemical Industrial
Vulcanization accelerator 3: PERKACIT DPG GRS made by Flexsys
Sulfur: Gold Flower Brand oil-treated sulfur powder made by Tsurumi Chemical
Vulcanization retarder: SANTOGARD PVI DS POWDER made by Flexsys Examples 1 to 8 and Comparative Examples 1 to 6

215/65R16 tires were prepared by assembling layers A and B, together, using the compounds I to IX and were evaluated as shown in Tables II and Table III.

TABLE II

|  | Example | | | | Comparative Example | | |
|---|---|---|---|---|---|---|---|
|  | 1 | 2 | 3 | 4 | 1 | 2 | 3 |
| Layer A (cap tread) | VIII | VIII | IX | IX | VIII | VIII | IX |
| Layer B (under tread) | I | II | III | IV | V | VI | VII |
| Compound physical values | | | | | | | |
| $E_A$ (60° C.)/$E_B$ (60° C.) | 0.54 | 0.46 | 0.66 | 0.61 | 1.22 | 1.14 | 0.92 |
| $E_B$ (60° C.) | 12.9 | 15.1 | 11.6 | 12.5 | 5.7 | 6.1 | 8.3 |
| $E_B$ (20° C.)-$E_B$ (60° C.) | 2.3 | 4.4 | 3.41 | 2.2 | 7.2 | 8.1 | 7.8 |
| ($A_A$/$A_A$ + $A_B$) | 0.5 | 0.5 | 0.5 | 0.5 | 0.5 | 0.5 | 0.5 |
| Tire properties | | | | | | | |
| Durability index | 110 | 115 | 105 | 108 | 90 | 95 | 100 |

TABLE III

|  | Example | | | | Comparative Example | | |
|---|---|---|---|---|---|---|---|
|  | 5 | 6 | 7 | 8 | 4 | 5 | 6 |
| Layer A (cap tread) | VIII | VIII | IX | IX | VIII | VIII | VIII |
| Layer B (under tread) | I | II | III | III | V | VI | II |
| Compound physical values | | | | | | | |
| ($A_A$/$A_A$ + $A_B$) | 0.5 | 0.5 | 0.3 | 0.6 | 0.5 | 0.3 | 0.15 |
| Tire properties | | | | | | | |
| Durability (index) | 110 | 115 | 110 | 105 | 100 | 100 | 125 |
| Steering stability (index) | 110 | 115 | 120 | 105 | 100 | 105 | 105 |
| Steering stability (index) at end-stage abrasion | 110 | 115 | 110 | 105 | 100 | 80 | 70 |

Evaluation Tests of Tire Performance

Durability: After a JATMA high speed durability test was conducted by a drum of a diameter of 1707 mm, the speed was increased every 30 minutes by 10 km/h until the tire was broken. The results are indexed to the value of Comparative Example 4 as 100. The larger the value, the higher the durability.

Steering stability: Tires were mounted on Japanese 2.5 liter class vehicles and the actual steering stability was evaluated by five people from our Company. The results are indexed to the value of Comparative Example 4 as 100. The larger the value, the more superior the steering stability.

Steering stability at the end-stage abrasion: The tires, following the steering stability evaluation, were further abraded until the tread depth became 5 mm, then the abovementioned steering stability evaluation was performed. The results are shown, as indexed to the value of Comparative Example 4 as 100. The larger the value, the more superior the steering stability.

INDUSTRIAL APPLICABILITY

The present invention makes the under tread layer of the tread part a specific high storage elastic modulus and decreases the temperature dependency to thereby greatly improve the durability over the past. Further, it makes the ratio of the cross-sectional areas of the cap tread layer and the under tread layer a certain specific value to enable the provision of a pneumatic tire superior in both durability and steering stability.

The invention claimed is:

1. A pneumatic tire having a tread part comprising a cap tread layer (i.e., layer A) and an under tread layer (i.e., layer B), wherein, in the pneumatic tire, when storage elastic moduli of the rubber compositions constituting the layer A and the layer B, respectively, are designated as $E_A$ and $E_B$, the storage elastic moduli $E_A$ at 60° C. and $E_B$ at 60° C. determined at a temperature of 60° C. satisfy the following formulae (1) and (2):

$$E_A(60°\ C.)/E_B(60°\ C.) \leq 0.66 \tag{1}$$

$$10(MPa) \leq E_B(60°\ C.) \tag{2}$$

and a difference between a storage elastic modulus $E_B$ (20° C.) of the rubber of the layer B determined at 20° C. and a storage elastic modulus $E_B$ (60° C.) determined at 60° C. satisfies the following formula (3):

$$E_B(20°\ C.) - E_B(60°\ C.) \leq 4.5(MPa) \tag{3}$$

and wherein, when a cross-sectional area of the layer A is $A_A$ and a cross-sectional area of the layer B is $A_B$, a ratio of $A_A/(A_A+A_B)$ satisfies the following formula (4):

$$0.30 \leq A_A/(A_A+A_B) \leq 0.60 \tag{4}$$

and wherein said rubber composition for layer B consists essentially of:

(a) 100 parts by weight of a polymer component consisting of (i) 25-50 parts by weight (phr) of a polybutadiene rubber including syndiotactic crystal ingredient, and (ii) 75-50 parts by weight (phr) of natural rubber (NR), (b) 65-100 parts by weight of carbon black having a nitrogen adsorption specific surface area ($N_2SA$) of 60-140 $m^2/g$ and a dibutyl phthalate adsorption (DBP) of 70-180 $cm^3/100\ g$ and (c) aromatic oil, sulfur and stearic acid, and (d) as the only vulcanization or cross-linking accelerator at least one member selected from the group consisting of N-tert-butylbenzothiazole-2-sulfenamide, N-cyclohexyl-benzothiazole-2-sulfenamide, and diphenyl guanidine and optionally, (e) silica, as a filler, other than said carbon black (b).

2. A pneumatic tire as claimed in claim 1, wherein 70 to 100 parts by weight of carbon black, based upon 100 parts by weight of rubber, is used in the layer B.

3. A pneumatic tire as claimed in claim 1, wherein formula (4) is $$0.45 \leq A_A/(A_A+A_B) \leq 0.50 \tag{4}$$

* * * * *